United States Patent
Goncalves

(10) Patent No.: US 11,814,184 B2
(45) Date of Patent: Nov. 14, 2023

(54) ASSEMBLY FOR AN AIRCRAFT HAVING A PYLON AND A NACELLE COMPRISING A VISOR FITTED WITH TENSIONING SYSTEMS AND CENTERING SYSTEMS

(71) Applicant: Airbus Operations SAS, Toulouse (FR)

(72) Inventor: José Goncalves, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 64 days.

(21) Appl. No.: 17/532,813

(22) Filed: Nov. 22, 2021

(65) Prior Publication Data
US 2022/0161938 A1    May 26, 2022

(30) Foreign Application Priority Data
Nov. 24, 2020 (FR) ...................................... 2012076

(51) Int. Cl.
*B64D 29/06* (2006.01)
*B64D 29/08* (2006.01)
(Continued)

(52) U.S. Cl.
CPC ............. *B64D 29/06* (2013.01); *B64D 29/08* (2013.01); *F16B 5/0208* (2013.01);
(Continued)

(58) Field of Classification Search
CPC .......... B64D 29/06; B64D 29/08; B64D 7/02; B64D 29/00; B64D 29/02; F16B 5/0208;
(Continued)

(56) References Cited

U.S. PATENT DOCUMENTS 3,109,214 A    11/1963    Clay
3,318,622 A     5/1967    Crumpler
(Continued)

FOREIGN PATENT DOCUMENTS

EP    1535840 A1    6/2005
EP    3670350 A1    6/2020
(Continued)

OTHER PUBLICATIONS

French Search Report; priority document.

*Primary Examiner* — Dominick L Plakkoottam
*Assistant Examiner* — Paul W Thiede
(74) *Attorney, Agent, or Firm* — Greer, Burns & Crain, Ltd.

(57) ABSTRACT

An assembly of a pylon and of a nacelle of an aircraft, wherein the nacelle has a structure, a visor, two centering systems and two tensioning systems. Each tensioning system comprises a first fitting, which is attached to the structure and has an engagement wall through which an orifice passes, a second fitting, which is attached to the visor, a threaded rod that is articulated on the second fitting and passes through the orifice, a spring element fitted on the threaded rod against the opposite face of the engagement wall from the second fitting, and an arresting means that blocks the spring element. Each centering system comprises a first fitting, which is attached to the structure and has a bore, and a second fitting, which is attached to the visor and bears a shaft that is accommodated in the bore.

5 Claims, 4 Drawing Sheets

(51) Int. Cl.
 *F16B 5/02* (2006.01)
 *B64D 29/00* (2006.01)
 *B64D 7/02* (2006.01)
 *B64D 29/02* (2006.01)

(52) U.S. Cl.
 CPC .............. *F16B 5/0266* (2013.01); *B64D 7/02* (2013.01); *B64D 29/00* (2013.01); *B64D 29/02* (2013.01)

(58) Field of Classification Search
 CPC ........... F16B 5/0266; Y10T 403/32819; Y10T 403/32827; Y10T 403/3286; F16C 11/045
 See application file for complete search history.

(56) References Cited

U.S. PATENT DOCUMENTS

| | | |
|---|---|---|
| 2006/0060697 A1 | 3/2006 | Beaufort |
| 2016/0031563 A1* | 2/2016 | Pautis .................... B64D 29/08 60/770 |
| 2018/0362172 A1* | 12/2018 | Paolini ................. F01D 25/265 |
| 2020/0025088 A1* | 1/2020 | Geliot .................... B64D 29/08 |
| 2020/0198793 A1* | 6/2020 | Geliot .................... B64D 27/18 |

FOREIGN PATENT DOCUMENTS

| | | | | |
|---|---|---|---|---|
| FR | 2903075 A1 * | 1/2008 | ............ | B64D 29/06 |
| FR | 3081837 A1 | 12/2019 | | |

* cited by examiner

_US 11,814,184 B2_

ASSEMBLY FOR AN AIRCRAFT HAVING A PYLON AND A NACELLE COMPRISING A VISOR FITTED WITH TENSIONING SYSTEMS AND CENTERING SYSTEMS

CROSS-REFERENCES TO RELATED APPLICATIONS

This application claims the benefit of the French patent application No. 2012076 filed on Nov. 24, 2020, the entire disclosures of which are incorporated herein by way of reference.

BACKGROUND OF THE INVENTION

The present invention relates to an assembly for an aircraft, wherein the assembly has a pylon and a nacelle which itself comprises a visor fitted with tensioning systems and centering systems, and to an aircraft comprising such an assembly.

An aircraft conventionally comprises a fuselage, on either side of which is attached a wing. Each wing supports at least one mounting pylon which in turn supports a nacelle and an engine forming a turbomachine. The nacelle forms the aerodynamic surface that surrounds the engine. The mounting pylon is attached between the wing structure and the nacelle.

FIG. 2 shows a perspective view of a propulsion system 200 comprising an engine/motor 202, represented here by its nozzle, and a nacelle 204. The nacelle 204 has an air intake 206 and is attached to the wing via the pylon 208.

The nacelle 204 has a structure that is attached to the pylon 208 and bears a plurality of cowls, including an air-intake cowl 210 that surrounds the air intake 206, lateral cowls 212, in particular, fan cowls and thrust-reversal cowls, that are on either side of the nacelle 204, and an upper cowl 214 providing a fairing around the junction between the pylon 208 and the structure of the nacelle 204.

The nacelle 204 also has a visor 220, which is an aerodynamic cowl that aerodynamically links the air-intake cowl 210, the lateral cowls 212 and the upper cowl 214.

In the case of the prior art, the visor 220 is attached via relatively bulky and complex attachment means.

It is therefore necessary to find an embodiment which limits the bulk of the attachment means and makes mounting and adjustment easier.

SUMMARY OF THE INVENTION

An object of the present invention is to propose an assembly for an aircraft, wherein the assembly has a pylon and a nacelle comprising a visor fitted with a tensioning system and a centering system which are simple and easy to implement.

To that end, what is proposed is an assembly for an aircraft, the assembly having a pylon and a generally cylindrical nacelle intended to surround an engine of the aircraft, wherein the nacelle has a median plane and comprises:
attachment to the pylon,
an air-intake cowl that surrounds an air intake of the nacelle,
lateral cowls disposed on either side of the median plane of the nacelle,
an upper cowl providing the fairing around the junction, a visor composed of an arcuate cowl that aerodynamically links the air-intake cowl, the lateral cowls and the upper cowl, and
attachment means comprising two centering systems and two tensioning systems, wherein the two tensioning systems are disposed on either side of the median plane of the nacelle and between the two centering systems,
wherein each tensioning system comprises:
a first fitting, which is attached to a wall of the nacelle,
a second fitting, which is attached to the visor,
a threaded rod, a first end of which is mounted articulated on the second fitting,
a spring element, and
an arresting means,
wherein the first fitting has an engagement wall through which an orifice passes and which has a face that is oriented towards the second fitting and an opposite face,
wherein the threaded rod passes through the orifice, wherein the spring element is fitted on the threaded rod and positioned by the opposite face of the engagement wall from the second fitting and wherein the arresting means prevents movement of the spring element,
wherein each centering system comprises:
a first fitting, which is attached to a wall of the nacelle,
a second fitting, which is attached to the visor,
wherein one of the fittings has a bore, and the other fitting bears a shaft that is accommodated in the bore.

With such an installation, the bulk of the attachment means is reduced.

Advantageously, the articulation of the threaded rod is implemented by a ball-joint system mounted on the second fitting of the arresting means.

Advantageously, the spring element is a stack of Belleville washers.

Advantageously, the arresting means is composed of two nuts screwed onto the second end of the threaded rod.

Advantageously, the shaft takes the form of a threaded rod and the centering system comprises a nut which is screwed onto the threaded rod, sandwiching the first fitting or respectively the second fitting of the centering system.

The invention also proposes an aircraft having an assembly according to one of the preceding variants.

BRIEF DESCRIPTION OF THE DRAWINGS

The above-mentioned features of the invention, along with others, will become more clearly apparent upon reading the following description of an exemplary embodiment, the description being given with reference to the appended drawings, in which.

DETAILED DESCRIPTION OF THE PREFERRED EMBODIMENTS

Figure 1:
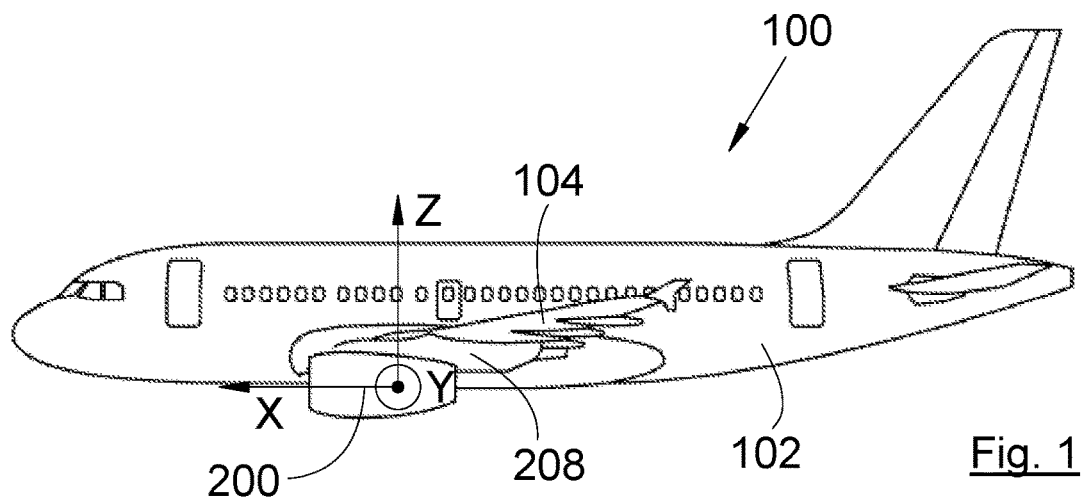
FIG. 1 is a side view of an aircraft according to the invention.

In the following description, terms relating to a position refer to a nacelle mounted on an aircraft that is moving forwards, that is to say as shown in FIG. 1.

FIG. 1 shows an aircraft 100 which comprises a fuselage 102, on either side of which is attached a wing 104. Below each wing 104 is attached a mounting pylon 208, to which is mounted a propulsion system 200 that comprises a generally cylindrical nacelle 204 and an engine/motor 202 that is surrounded by the nacelle 204. An assembly according to the invention thus has the pylon 208 and the nacelle 204.

In the following description, and as is conventional, the X axis is the longitudinal axis of the nacelle, with positive orientation in the direction of forward movement of the aircraft 100, this being also parallel to the longitudinal axis of the aircraft 100; the Y axis is the transverse axis of the nacelle and is horizontal when the aircraft 100 is on the ground; and the Z axis is the vertical axis or vertical height when the aircraft 100 is on the ground, these three directions X, Y and Z being mutually orthogonal and forming an orthogonal reference system. The nacelle thus has a longitudinal median plane XZ which here is vertical and parallel to the longitudinal axis X and separates the nacelle into two parts, a left part and a right part.

Figure 2:
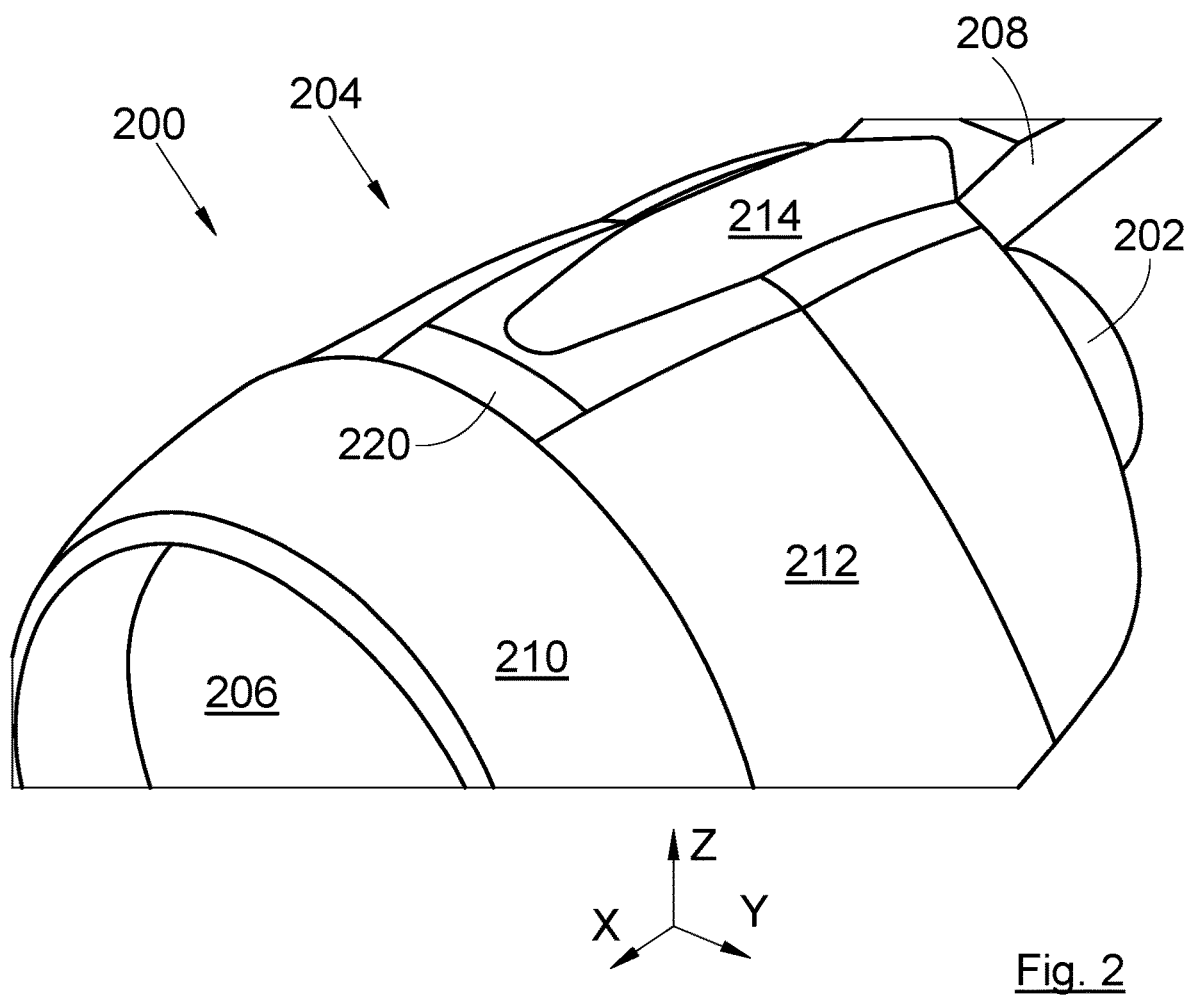
FIG. 2 is a perspective view of a nacelle.

FIG. 2 shows a perspective view of a propulsion system 200 which is similar to that of the prior art as only the means for attaching the visor 220 are different.

Therefore, the propulsion system comprises the engine/motor 202 and the nacelle 204. The nacelle is attached to the pylon 208 which extends from the nacelle 204 at a rear end of the nacelle 204. The nacelle 204 comprises multiple cowls (or fairings) for producing an aerodynamic surface.

The nacelle 204 thus comprises, around its air intake 206, an air-intake cowl 210, and the nacelle 204 also comprises, on either side of the median plane XZ of the nacelle 204, lateral cowls 212 and, above the nacelle 204, an upper cowl 214 providing the fairing for the nacelle 204.

The nacelle 204 has an aerodynamic visor 220 that is composed of an arcuate cowl that aerodynamically links the air-intake cowl 210, the lateral cowls 212 and the upper cowl 214. The cowl is arcuate to match the shape of the nacelle 204.

The visor 220 is attached by attachment means comprising centering systems and tensioning systems which ensure that the visor 220 is positioned and firmly pressed.

Figure 3:
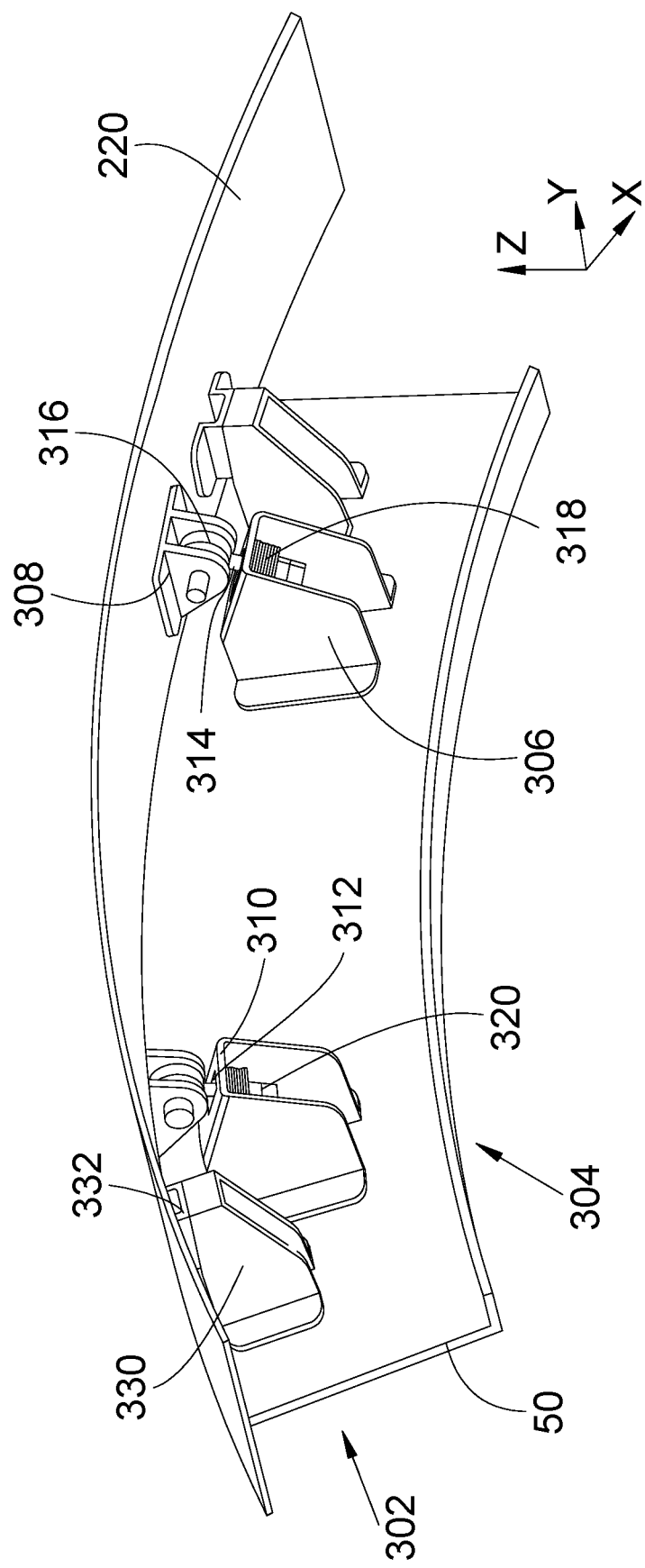
FIG. 3 is a perspective front view of a visor according to the invention.

FIG. 3 shows the visor 220, wherein the attachment means comprise two centering systems 302 and two tensioning systems 304.

As shown in FIG. 3, the two tensioning systems 304 are disposed on either side of the median plane of the nacelle 204 and between the two centering systems 302.

This arrangement offers the possibility of moving the visor 220 about the transverse axis Y while holding it in place in the Z axis to prevent it tearing off.

Figure 4:
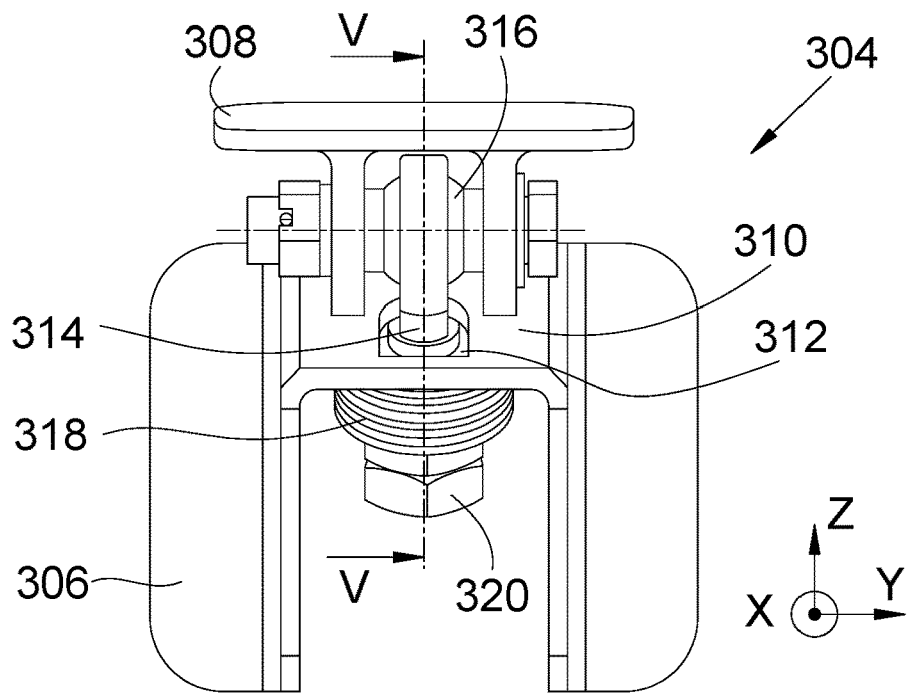
FIG. 4 is a front view of a tensioning system according to the invention.
Figure 5:
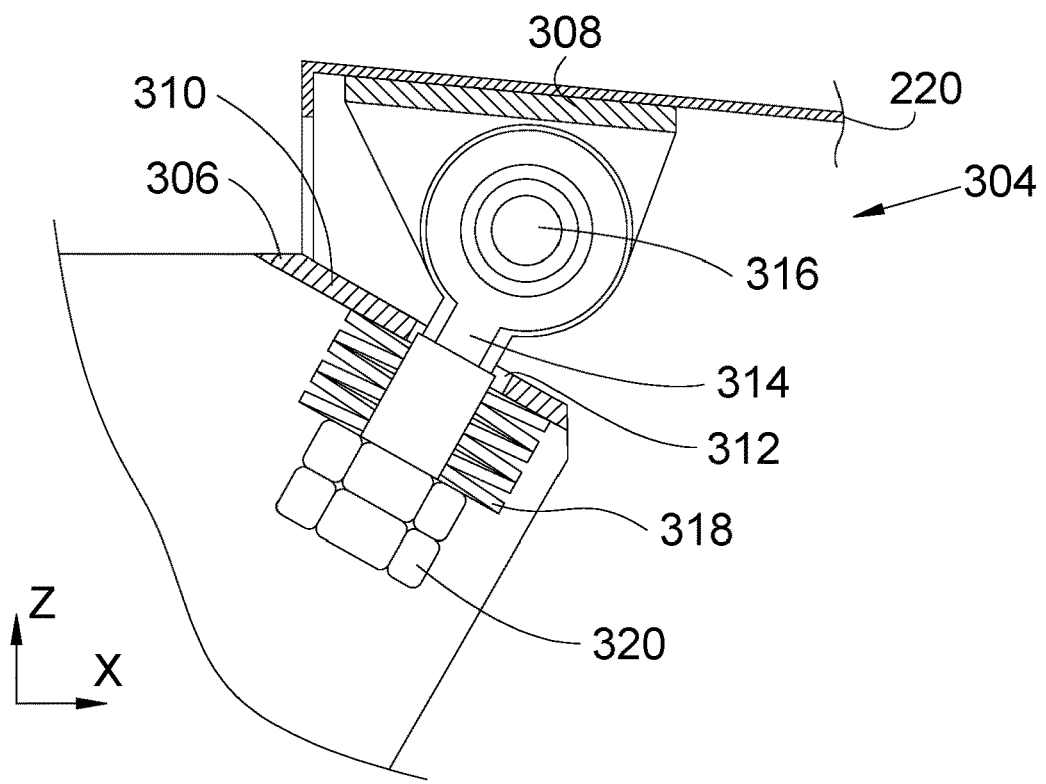
FIG. 5 is a sectional view along the line V-V in FIG. 4.
Figure 6:
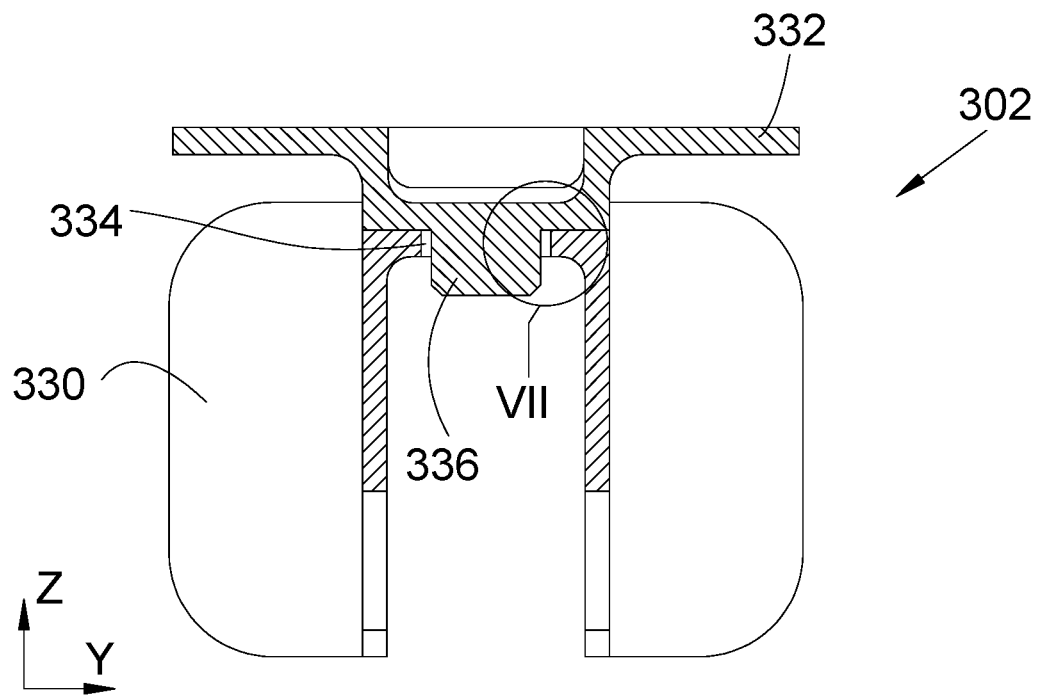
FIG. 6 is a sectional front view of a centering system according to the invention.
Figure 7:
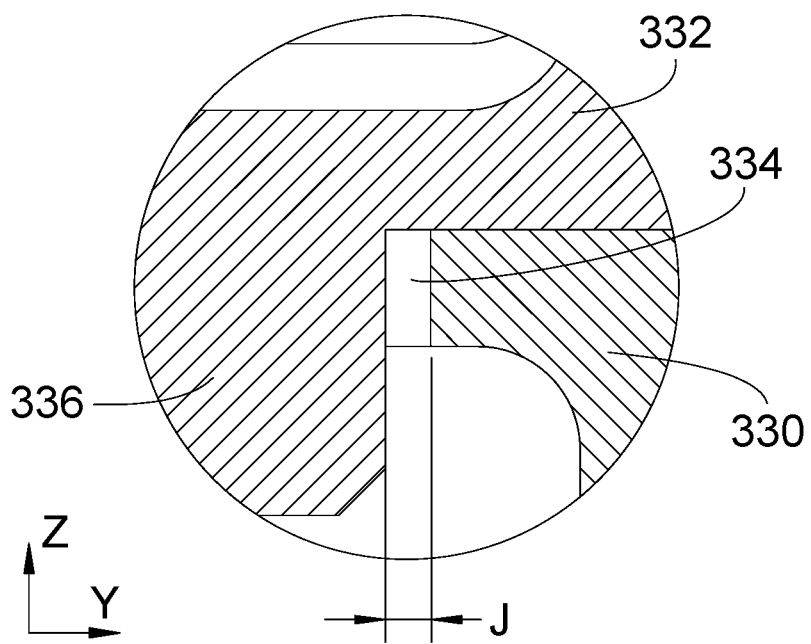
FIG. 7 is an enlarged view of detail VII in FIG. 6.

FIGS. 4 and 5 show a tensioning system 304 and FIGS. 6 and 7 show a centering system 302.

The tensioning system 304 comprises a first fitting 306 attached to the nacelle 204, and a second fitting 308 attached to the visor 220 of the nacelle 204. The nacelle 204 is represented here by a wall 50.

The first fitting 306 has an engagement wall 310 through which an orifice 312 passes. The engagement wall 310 has a face that is oriented towards the second fitting 308 and an opposite face.

The tensioning system 304 also comprises the threaded rod 314, a first end of which is mounted articulated on the second fitting 308. The articulation of the threaded rod 314 is implemented here by a ball-joint system 316 which is mounted on the second fitting 308 and to which the first end of the threaded rod 314 is secured. The installation of the ball-joint system 316 allows more degrees of freedom.

The tensioning system 304 also comprises a spring element 318 that is fitted on the threaded rod 314, and an arresting means 320 that holds the spring element 318 in place on the threaded rod 314.

Once the tensioning system 304 has been installed, the threaded rod 314 passes through the orifice 312, the spring element 318 is fitted on the threaded rod 314 and positioned on the side of the opposite face of the engagement wall 310 from the second fitting 308 and the arresting means 320 prevents movement of the spring element 318.

As can be better seen in FIG. 5, the spring element 318 is tensioned by clamping between the engagement wall 310 and the arresting means 320.

The spring element 318 may be for example a compression spring or, as is the case here, a stack of Belleville washers.

In the embodiment of the invention presented in FIGS. 3 to 5, the arresting means 320 is composed of two nuts screwed onto the second end of the threaded rod 314, but it may be composed of any other element that holds the spring element 318 in place.

The greater the tension in the spring element 318, the greater the return force exerted on the visor 220. The tensioning system 304 may thus counteract suction forces acting on the visor 220. The tension of the spring element 318 may be modified by changing the spring element 318 or by modifying the clamping of the nuts of the arresting means 320.

The centering system 302 comprises a first fitting 330 which is attached to the wall 50 of the nacelle 204 and a second fitting 332 which is attached to the visor 220.

One of the fittings, in this case the first fitting 330, has a bore 334, and the other fitting, in this case the second fitting 332, bears a shaft 336 that is accommodated in the bore 334. The axis of the bore 334 and the axis of the shaft 336 are parallel when the shaft 336 is introduced into the bore 334 and these axes are generally parallel to the direction followed by the visor 220 when it is being installed.

The introduction of each shaft 336 into the associated bore 334 makes it possible to position the visor 220. The rotation about the X axis of the visor 220 in relation to the air intake is limited by the two shafts 336 installed on either side of the visor 220.

At the same time as each centering system 302 is installed, the installation of the tensioning system 304 consists in introducing the threaded rod 314 into the orifice 312, in positioning the spring element 318 along the threaded rod 314 by pressing it firmly against the opposite face of the engagement wall 310 from the second fitting 308, then in installing the arresting means 320 at the second end of the threaded rod 314.

The attachment means are thus relatively compact, since the centering systems 302 and the tensioning systems 304 are partly installed on the visor 220 and, provided that all the systems are concentrated around the visor 220, mounting and adjustment are made easier.

In the embodiment of the invention presented here, the positioning of the spring element 318 along the threaded rod 314 comprises fitting the Belleville washers via the second end of the threaded rod 314.

In the embodiment of the invention presented here, the installation of the arresting means 320 consists in screwing on the two nuts.

FIG. 7 shows the clearance T between the diameter of the bore 334 and the diameter of the shaft 336. The magnitude of this clearance T makes it possible to control the position of the visor 220.

In the embodiment of the invention presented here, the bore 334 and the shaft 336 are circular in order to have the same clearance T in all directions, in particular X and Y, but in order to manage different clearances T depending on the direction, it is possible to adapt the shape of the bore 334 and/or of the shaft 336.

In order to strengthen the holding force of the visor 220, the shaft 336 may take the form of a threaded rod and the centering system 302 then comprises a nut which is screwed onto the threaded rod, sandwiching the first fitting 330 or respectively the second fitting 332.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft, said assembly having a pylon and a cylindrical nacelle intended to surround an engine of the aircraft,
   wherein the nacelle has a median plane and comprises:
   attachment to the pylon,
   an air-intake cowl that surrounds an air intake of the nacelle,
   lateral cowls disposed on either side of the median plane of the nacelle,
   an upper cowl providing the fairing around said junction,
   a visor composed of an arcuate cowl that aerodynamically links the air-intake cowl, the lateral cowls and the upper cowl, and
   attachment means comprising two centering systems and two tensioning systems, wherein the two tensioning systems are disposed on either side of the median plane of the nacelle and between the two centering systems,
   wherein each tensioning system comprises:
   a first fitting attached to a wall of the nacelle,
   a second fitting attached to the visor,
   a threaded rod, a first end of which is mounted articulated on the second fitting,
   a spring element, and
   an arresting means,
   wherein the first fitting has an engagement wall through which an orifice passes and which has a face that is oriented towards the second fitting and an opposite face,
   wherein the threaded rod passes through the orifice,
   wherein the spring element is fitted on the threaded rod and positioned by the opposite face of the engagement wall from the second fitting, and
   wherein the arresting means prevents movement of the spring element,
   wherein each centering system comprises:
   a first fitting attached to the wall of the nacelle, and
   a second fitting attached to the visor,
   wherein one of the centering system fittings has a bore, and the other centering system fitting bears a shaft that is accommodated in the bore.

2. The assembly according to claim 1, wherein articulation of the threaded rod is implemented by a ball-joint system mounted on the second fitting of the tensioning system.

3. The assembly according to claim 1, wherein the spring element is a stack of Belleville washers.

4. The assembly according to claim 1, wherein the arresting means is composed of two nuts screwed onto a second end of the threaded rod.

5. An aircraft comprising an assembly according to claim 1.

* * * * *